United States Patent [19]
Ishikawa et al.

[11] Patent Number: 5,629,031
[45] Date of Patent: May 13, 1997

[54] REMOVER FOR INJECTION-MOLDED ARTICLE

[75] Inventors: Sosuke Ishikawa; Toshihiko Ohhashi, both of Tokyo; Tetsuro Shiozaki, Kyoto, all of Japan

[73] Assignees: Yushin Precision Equiptment Co., Ltd., Kyoto; Sumitomo Heavy Industries, Ltd., Tokyo, both of Japan

[21] Appl. No.: 458,281

[22] Filed: Jun. 2, 1995

[30] Foreign Application Priority Data

Jun. 15, 1994 [JP] Japan .................... 6-158050

[51] Int. Cl.$^6$ ........................ B29C 45/80
[52] U.S. Cl. .................. 425/139; 264/334; 425/165; 425/556
[58] Field of Search ............... 425/139, 556, 425/165; 264/334

[56] References Cited

U.S. PATENT DOCUMENTS

| 4,368,018 | 1/1983 | Rees et al ............... | 425/139 |
| 5,250,239 | 10/1993 | Herbst .................. | 425/139 |
| 5,256,364 | 10/1993 | Herbst .................. | 425/556 |

FOREIGN PATENT DOCUMENTS

| 55-111218 | 8/1980 | Japan . | |
| 2290512 | 12/1987 | Japan ................... | 425/139 |

*Primary Examiner*—Tim Heitbrink
*Attorney, Agent, or Firm*—Armstrong, Westerman, Hattori, McLeland & Naughton

[57] ABSTRACT

A remover for an injection-molded article includes a front mold and a movable mold half connected to the front mold freely movable in a forward and backward direction and adapted to define an injection-molding cavity by association with the front mold. A detecting arrangement continuously detects a start time, a finish time, and a quantity of travel of the movable mold half. An ejector forces out a molded article at a mold-open finish position. A removing mechanism includes a grasping member for grasping the molded article. A control arrangement performs numerical control of the removing mechanism, so that when the detecting arrangement detects the finish time of the mold-open operation of the movable mold half, the removing mechanism moves the grasping member from a predetermined waiting position to a position for removing the molded article. A mold-close operation is started after the molded article held by the grasping member is moved out of the mold area, and the grasping member is controlled to move and withdraw from the mold area. The control arrangement supplies a mold-close signal to control the movable mold half to start moving in the direction corresponding to the mold-close operation at a predetermined timing after start of withdrawal of the grasping member from the mold area, whereby the mold-close operation finishes when withdrawal of the grasping member from the mold area finishes.

3 Claims, 6 Drawing Sheets

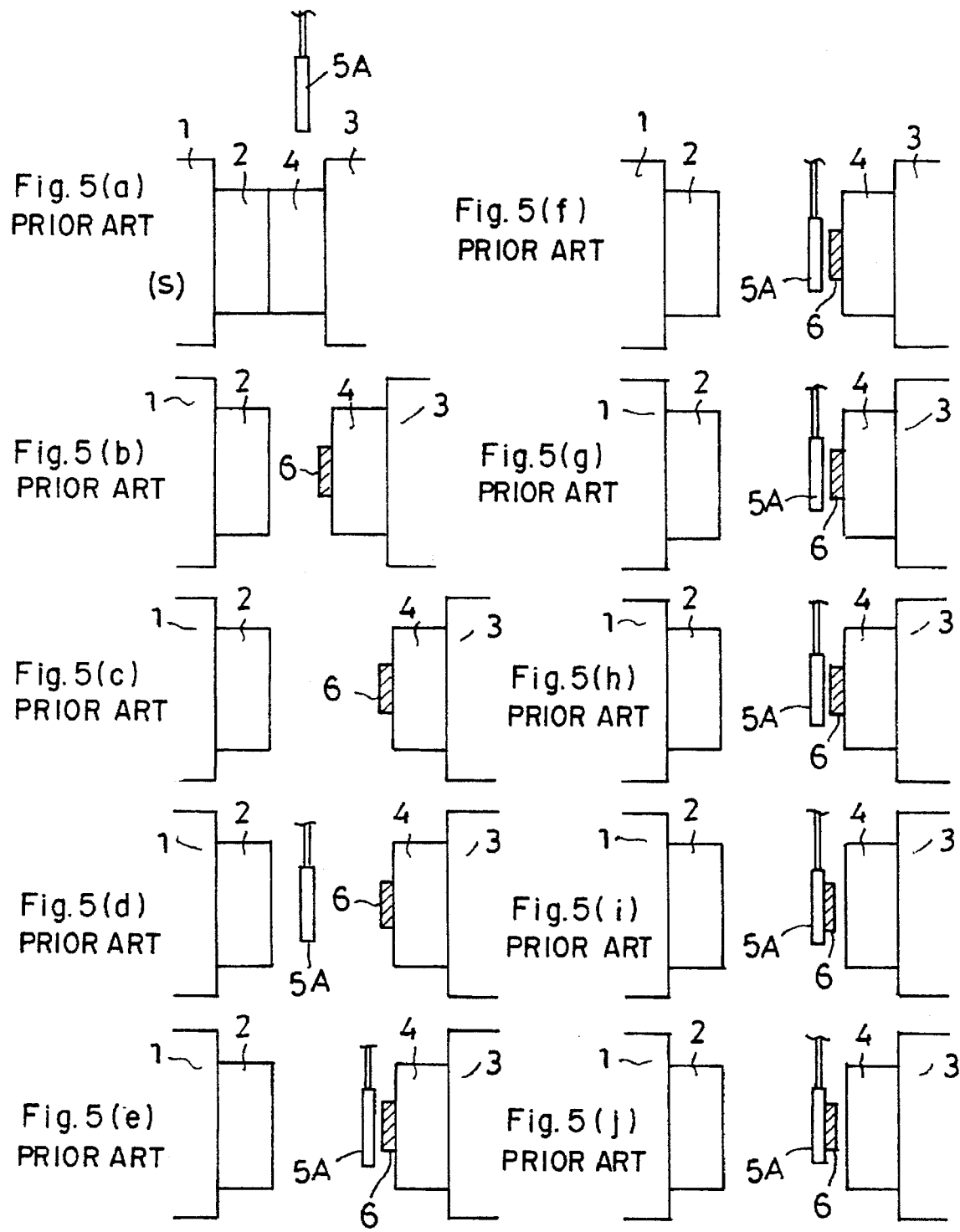

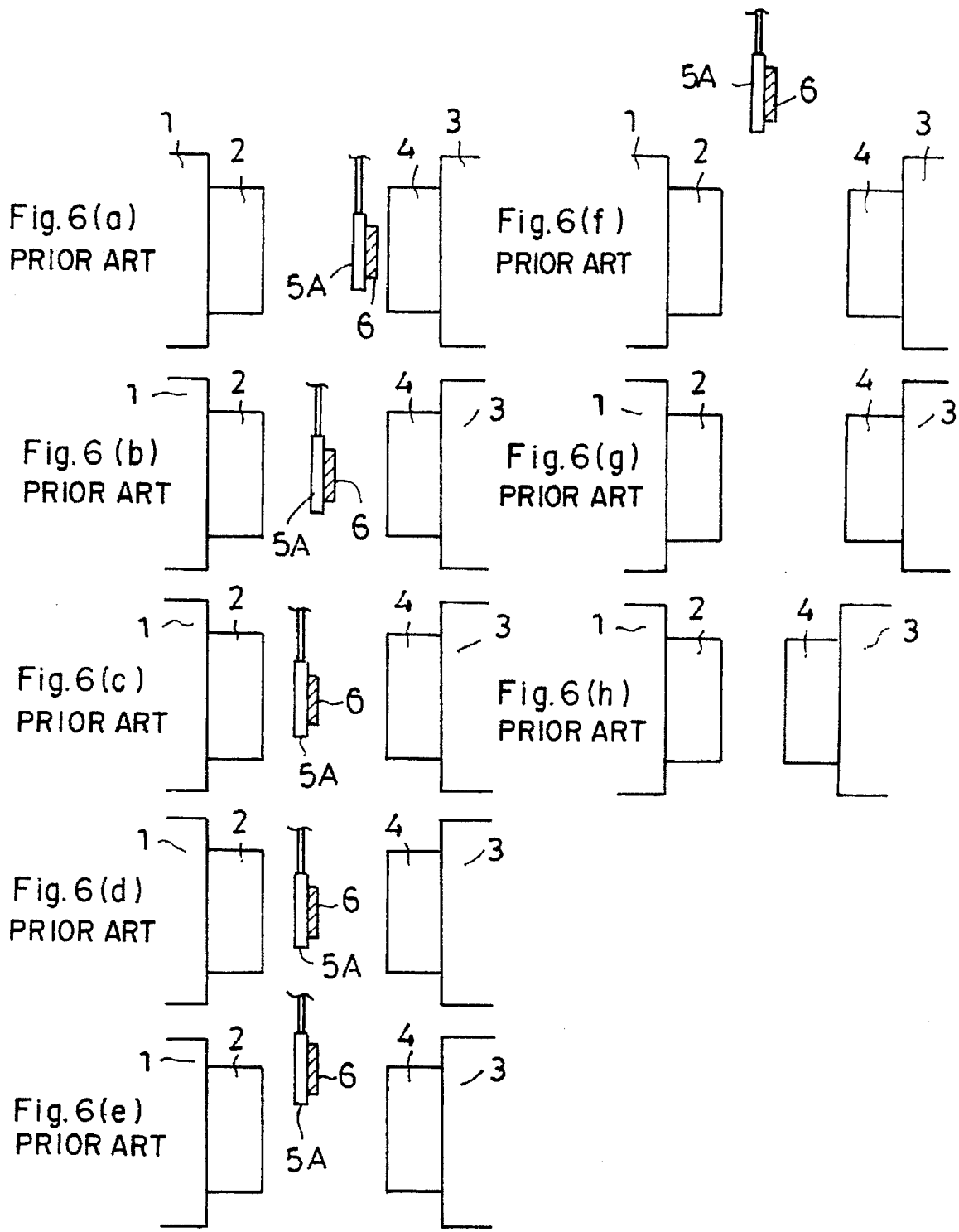

REMOVER FOR INJECTION-MOLDED ARTICLE

BACKGROUND OF THE INVENTION

1. Field of the Invention

The present invention relates to a remover for injection-molded articles which is adapted to automatically remove the injection-molded article of a plastic material provided by an injection machine.

2. Description of the Prior Art

Generally, an injection-molded plastic article provided by the the injection machine is adapted to be automatically removed by an injection-molded article remover. The conventional automatic removing steps will be detailed with referring to FIGS. 5(a) to 5(j) and FIGS. 6 (a) to 6(h) as attached.

(a) A front mold 2 mounted to a stationary platen 1 and a movable half 4 carried by a movable platen 3 are in the state of being clamped. Plastic melt is injected into a cavity (not shown) defined by the front mold 2 and the movable half 4 so as to be molded into a predetermined shape. A grasping member 5A in a removing mechanism (not shown) waits in a predetermined waiting position. A mold-open signal is then given from a control means (not shown) to an open-close mechanism (not shown) for the movable half 4.

(b) The movable half 4 starts the mold-open operation.

(c) The movable half 4 reaches an extreme position in the mold-open operation.

(d) The control means gives to the removing mechanism a signal causing the grasping member 5A to start entering the mold area.

(e) The grasping member 5A enters the mold area based on numerical control by the control means.

(f) The grasping member 5A reaches a predetermined position in the mold area based on numerical control by the control means.

(g) The control means gives an actuation-start signal to an actuator (not shown) for an ejector.

(h) The ejector (not shown) starts actuation.

(i) The ejector forces out an injection-molded article 6 and the grasping member 5A attractes and holds (i.e., by chucking) the injection-molded article 6 through actuation of pneumatic equipment assembled in the removing mechanism.

(j) The chucking of the molded article 6 by the grasping member 5A is recognized.

(k) The control means gives to the removing mechanism a draw out-start signal for causing the grasping member 5A to start drawing out the molded article from the mold.

(l) The grasping member 5A moves drawing out the molded article based on numerical control by the control means.

(m) The draw-out movement of the grasping member 5A finishes.

(n) The control means gives to the removing mechanism a withdrawal-start signal for causing the grasping member 5A to withdraw from the mold area.

(o) The grasping member 5A moves to withdraw from the mold area based on numerical control by the control means.

(p) The withdrawal movement of the grapsing member 5A finishes.

(q) The control means gives to the open-close mechanism for the movable half 4 a mold-close signal, and in turn, a start signal for a next cycle.

(r) The movable half 4 starts to more to the mold-close operation.

(s) The movable half 4 is brought into the mold-close state, i.e, the state (a) wherein the movable half 4 and the front mold are being clamped. The above procedure will be repeated allowing the molded articles 6 to be removed from the mold continuously.

The above removing procedure is performed by means of a sequence control and thus has such problems that it takes a relatively long time to remove the molded articles and requires a longer cycle of the injection-molding operation.

The conventional removing procedure suffers the disadvantage of loss of time between the steps (q) and (r), such as last time for scanning in the computer program and lost time required for receiving and transmitting signals in the sequencer. There occurs loss of time also in actuation of the open-close mechanism for the movable half during the mold-close operation, and in pressure transmission in a feeding passage (hydraulic piping) for a working fluid. It has been ascertained that actual measurements of the loss of time total to 0.2 to 0.4 sec. The loss of time is absolutely unnecessary in the molding and removing operation.

SUMMARY OF THE INVENTION

The present invention has been made in view of the above circumstances. An object of the present invention is to shorten the molding cycle, i.e, the whole cycle of the injection-molding and removing operation.

To achieve the above object, a remover for injection-molded articles according to the present invention comprises:

a front mold;

a movable half provided to the front mold in such manner of being freely movable forward and backward and adapted to define an injection-molding cavity by associating with the front mold;

a detecting means continuously detecting a start of movement and quantity of travel of the movable half;

an ejector which forces out a molded article at the mold-open finish position carried thereto by the movable half half molded in the cavity;

a removing mechanism provided with a grasping member for grasping the molded article forced out by the ejector; and a control means for making numerical control of the removing mechanism, so that when the detecting means detects the finish of the mold-open operation of the movable half, the control means makes numerical control of the removing mechanism to move the grasping member from a predetermined waiting position to a position for removing the molded article, and the mold-close operation is started after the molded article held by the grasping member is moved out of the mold area, characterized in that:

the movable half is adapted, through numerical control by the control means, to start moving in the direction of the mold-close operation at a predetermined timing after start of withdrawal of the grasping member from the mold area, so that the mold-close operation finishes when withdrawal of the grasping member from the mold area finishes.

According to the remover for injection-molded article of the present invention constructed above, the movable half starts moving in the direction of mold-close operation at a predetermined time interval from the actuation start of withdrawal of the grasping member from the mold area, so that when the grasping member finishes in the withdrawal from the mold area, the movable half finishes the mold-close operation. Hence, the invention does not suffer the disadvantage of loss of time, as in the conventional art, due to output of the mold-close signals made after completion of the grasping member's withdrawal from the mold area and the loss of time required for start of the movable half's movement in the mold-close operational direction. As a result, the invention is able to shorten the molding cycle to the extent of time corresponding to the total of the above noted losses of time as above in the conventional art.

The grasping member in the removing mechanism according to the present invention is adapted to linearly move forward and backward to go between the front mold and the movable half and withdraw from the mold area to the outside.

According to the removing mechanism, the grasping member is allowed to move forward and backward by use of a means making a linear forward and backward movement.

Furthermore, the grasping member in the removing mechanism according to the present invention is adapted to go into between the front mold and the movable half, through an arcuate forward and backward movement of the grasping member, and withdraw to the outside from the mold area.

According to the removing mechanism, the grasping member is allowed to move forward and backward by use of a means making an arcuate movement.

BRIEF DESCRIPTION OF THE DRAWINGS

FIGS. 5(a) to 5(j) are explanatory views showing a first half of the operation procedure of the conventional art.

FIGS. 6(a) to 6(h) are explanatory views showing a second half of the operation procedure of the conventional art.

DETAILED DESCRIPTION OF THE PREFERRED EMBODIMENT

Figure 1:
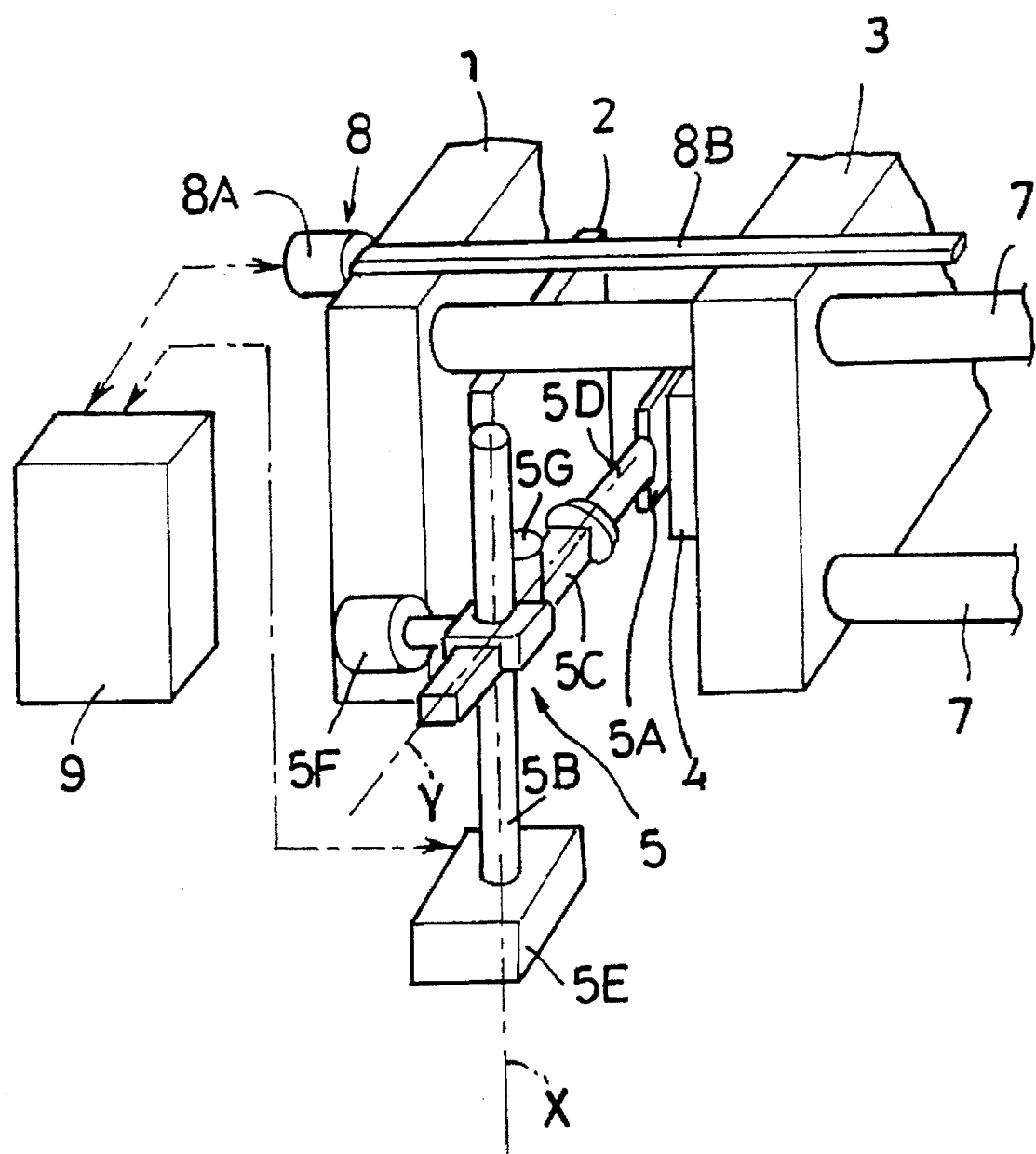
FIG. 1 is a perspective view of a principal portion of an injection-molding machine provided with the present invention.
Figure 2:
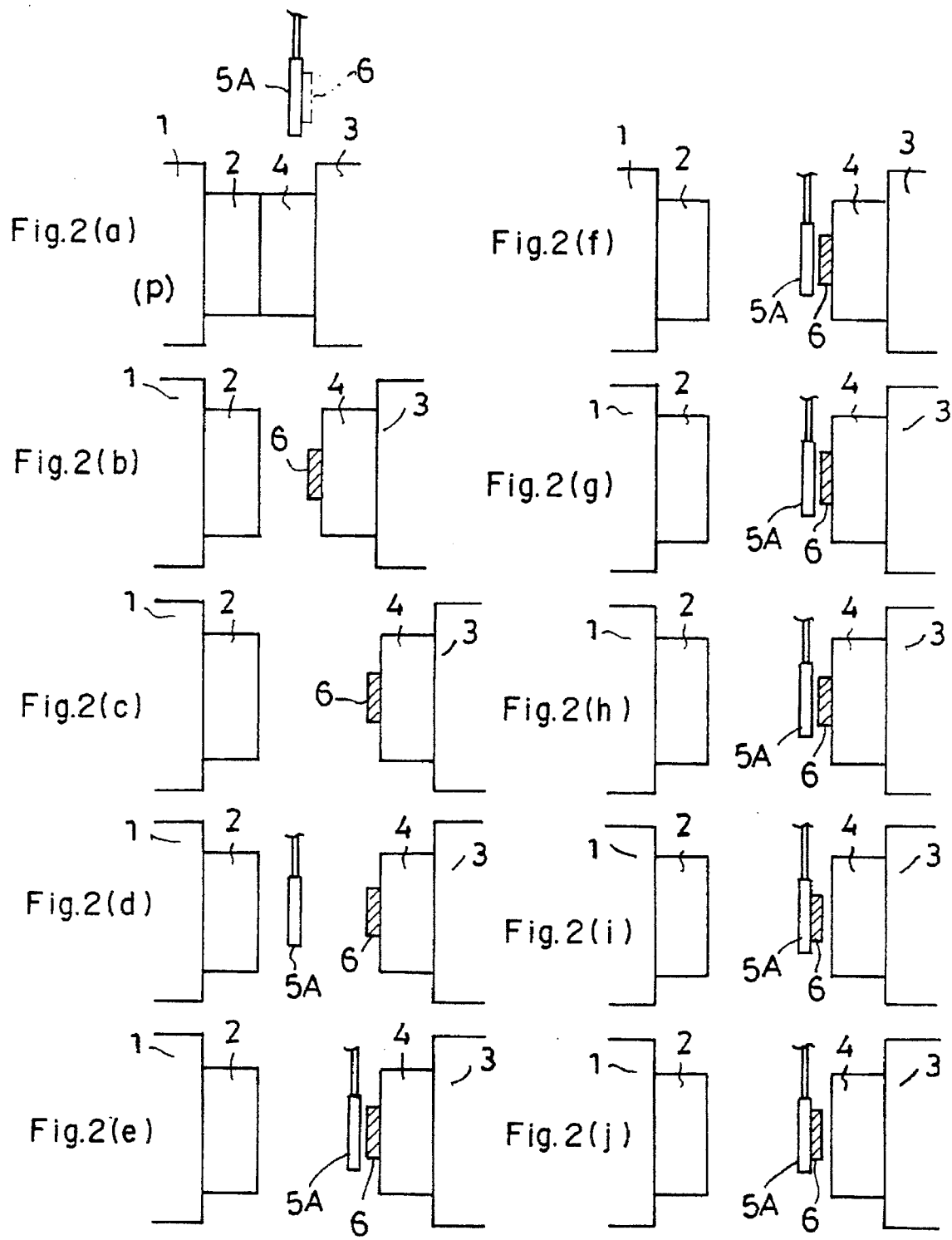
FIGS. 2(a) to 2(j) are explanatory views showing a first half of the operation procedure of the present invention.
Figure 3:
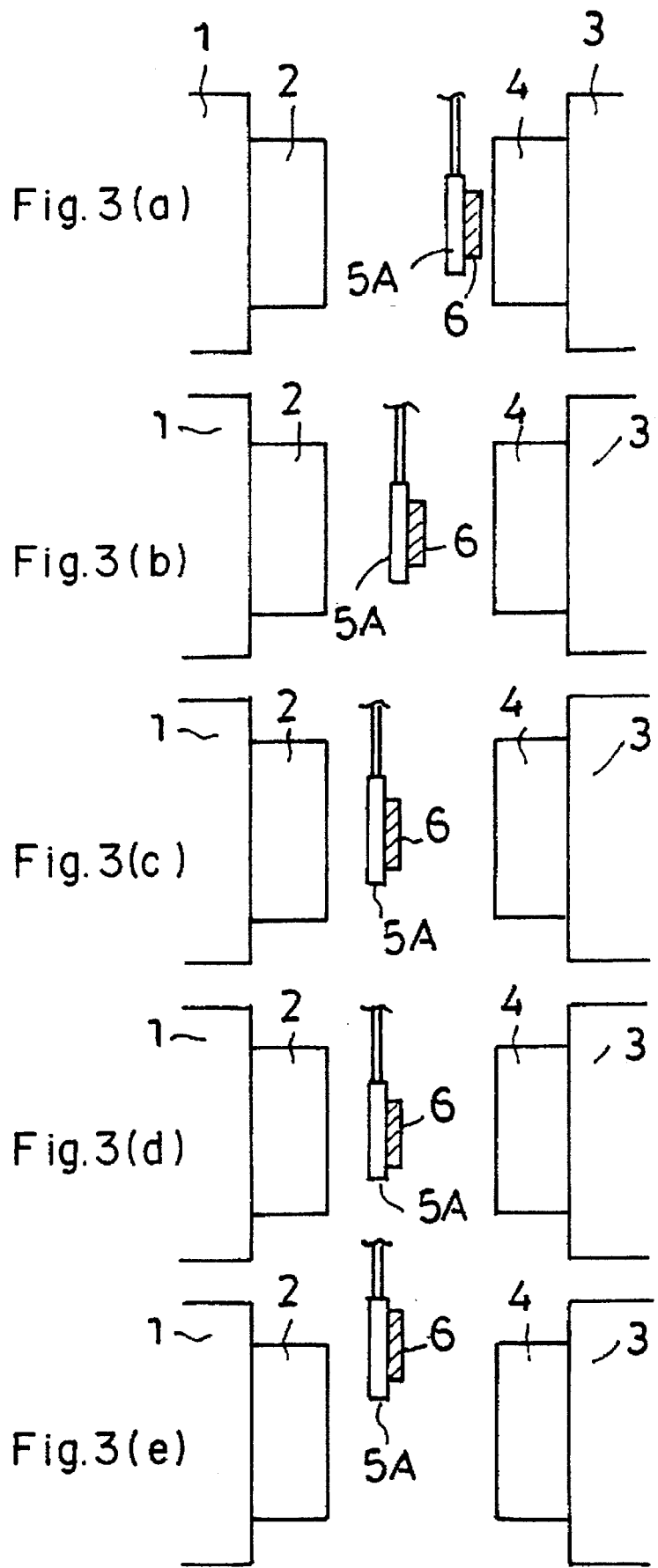
FIGS. 3(a) to 3(e) are explanatory views showing a second half of the operation procedure of the present invention.

In FIG. 1, a stationary platen 1 mounts a front mold 2 and a movable platen 3 mounts a movable half 4. The movable platen 3 is movable along a plurality of tie bars 7 which are supported at one end thereof to the stationary platen 1 so that the front mold 2 and the movable half 4 when in the mold-close state define therebetween a cavity (not shown) into which plastic melt is fed from an injection-molding machine (not shown).

A remover for injection-molded articles is provided with a detecting means 8 for detecting travel of the movable platen 3, and for detecting in turn, the movable half 4, and a removing mechanism 5 for removing an injection-molded article 6 and a controller 9. An ejector (not shown) for forcing out the molded article 6 is provided at the side of the movable platen 3.

The detecting means 8 comprises an encoder 8A mounted on the stationary platen 1 and a magnetic scale 8B mounted on the movable platen 3 and adapted to move relatively to the encoder 8A following movement of the movable platen 3. Hence, the quantity of travel of the movable platen 3, i.e., of the movable half 4 is detected by the encoder 8A continuously.

The removing mechanism 5 includes a support part 5B which extends along the vertical axis X and supports an arm part 5C extending perpendicularly to the support part 5B in the direction of horizontal axis Y. The arm part 5C has a removing arm 5D mounting at its remote end a chucking plate, having in turn, a grasping portion 5A.

A base 5E on which the support part 5B projects houses an air compressor and a servo-motor (both not shown), and the support part 5B and arm part 5C are each provided with a respective servo-motor 5F, 5G. Thus, the servo-motor 5F operates to move the arm part 5C in the directon of axis X, and the servo-motor 5G the removing arm in the direction of axis Y. In addition, the servo-motor housed in the base 5E operates to rotate the arm part 5C around the support part 5B. In other words, the grasping portion 5A in the removing mechanism 5 is linearly movable forward and backward to go between the front mold and the movable half and withdraw from the mold area to the outside.

The detecting means 8 is electrically connected to a control means 9 which controls actuation of the removing mechanism 5.

Next, the automatic removing procedure for injection-molded articles according to the present invention will be detailed with reference to the attached FIGS. 2(a) to 2(j) and FIGS. 3(a) to 3(e).

(a) The front mold 2 mounted to the stationary platen 1 and the movable half 4 carried by the movable platen 3 are in the state of being clamped (the mold-close state). Plastic melt is injected into a cavity (not shown) defined by the front mold 2 and the movable half 4 so as to be molded into a predetermined shape. The grasping member 5A in the removing mechanism (not shown) waits in a predetermined waiting position. A mold-open signal is then given from the control means 9 to an open-close mechanism (not shown) for the movable half 4.

(b) The movable half 4 starts the mold-open operation.

(c) The movable half 4 reaches an extreme position in the mold-open operation.

(d) The control means 9 gives to the removing mechanism a signal causing the grasping member 5A to start entering the mold area.

(e) The grasping member 5A moves in the mold area based on numerical control by the control means 9.

(f) The grasping member 5A reaches a predetermined position in the mold area based on numerical control by the control means 9.

(g) The control means 9 gives an actuation-start signal to an actuator (not shown) for an ejector.

(h) The ejector (not shown) starts actuation.

(i) The ejector forces out an injection-molded article 6 and the grasping member 5A attractes and holds (i.e, chucking) the injection-molded article 6 through actuation of a pneumatic equipment assembled in the removing mechanism. At the same time, the control means 9 gives a timer excitation signal to a timer for mold-close start signals (not shown) so as to actuate the timer.

(j) The chucking of the molded article 6 by the grasping member 5A is recognized.

(k) The control means 9 gives to the removing mechanism 5 a draw out-start signal for causing the grasping member 5A to start drawing out the molded article from the mold.

(l) The grasping member 5A moves to draw out the molded article through numerical control by the control means 9.

(m) The draw-out movement of the grasping member 5A finishes.

(n) The control means 9 gives to the removing mechanism 5 a withdrawal-start signal for causing the grasping member 5A to withdraw from the mold area.

(o) The grasping member 5A moves to withdraw from the mold area to the outside based on numerical control by the control means 9. And time set in the timer for mold-close start signals referred to in the step (i) elapses and the control means 9 gives a mold-close signal to the open-close mechanism for the movable half 4. In other words, the movable half 4 is caused to start moving in the mold-close direction at a time of a predetermined time interval from start of withdrawal of the grasping member 5A from the mold area.

(p) The withdrawal movement of the grapsing member 5A finishes, and simultaneously, the movable half 4 is completed to be clamped into the mold-close state, i.e, that of the step (a). The above procedure will be repeated allowing the molded articles 6 to be removed from the mold continuously.

As explained above, the invention provides that the movable half 4 is caused to start moving in the mold-close direction at a predetermined timing after start of withdrawal of the grasping member 5A from the mold area, as referred to in the above step (o), and that the withdrawal movement of the grapsing member 5A finishes, and simultaneously, the movable half 4 is completed to be clamped into the mold-close state, as referred to in the step (p). Hence, the invention does not suffer the disadvantage of loss of time, as in the conventional art, due to output of the mold-close signals made after completion of the grasping member's withdrawal from the mold area and loss of time required for start of the movable half's movement in the mold- close operational direction. As a result, the invention is able to shorten the molding cycle to the extent of time corresponding to the total of above note losses of time as above in the conventional art.

In the above example, it is so referred to in the step (i) that the molded article 6 is chucked by the grasping member 5A that the control means 9 gives a timer excitation signal to a timer for mold-close start signals (not shown) so as to actuate the timer. Timing for giving the timer excitation signal may alternatively be set in the step (j) or (k).

Figure 4:
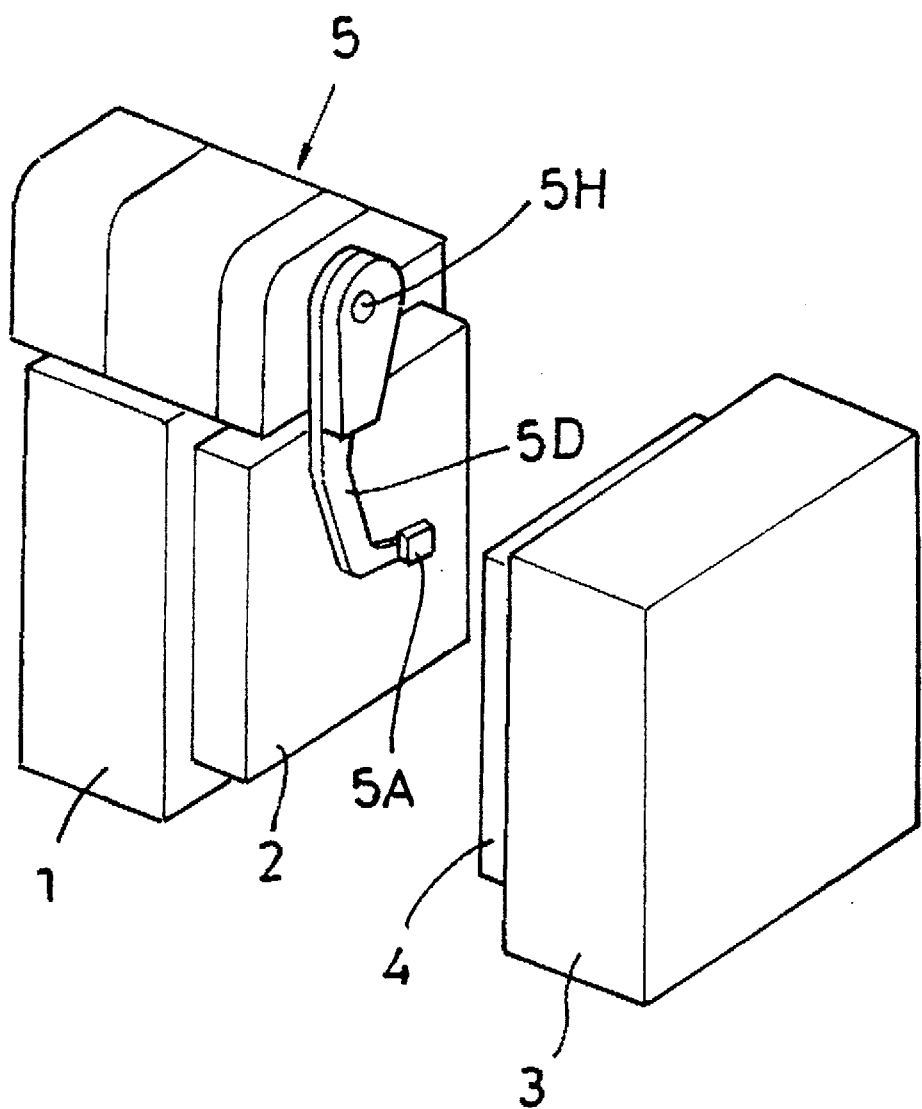
FIG. 4 is a perspective view of a modified example of a removing mechanism for removing an injection-molded article from the mold.

Furthermore, other than the removing mechanism 5 wherein the removing arm 5D and grasping member 5A linearly moves forward and backward upon the mold-open operation, such feature of the removing mechanism 5 as shown in FIG. 4 may be used that the removing arm 5D rotates around the axis 5H and the grasping member 5A makes an arcuate forward and backward movement upon the mold-open operation.

What we claimed is:

1. A remover for an injection-molded article comprising:

a front mold half;

a movable mold half movable in a forward and backward direction and being adapted to define an injection-molding cavity by associating with the front mold half;

a detecting means continuously detecting a start time, a finish time, and a quantity of travel of the movable mold half;

an ejector which forces out a molded article at a mold-open finish position carried thereto by the movable mold half molded in the cavity;

a removing mechanism having a grasping member for grasping the molded article forced out by the ejector; and a control means for performing numerical control of the removing mechanism, so that when the detecting means detects the finish time of the mold-open operation of the movable mold half, the control means makes numerical control of the removing mechanism to move the grasping member from a predetermined waiting position for removing the molded article, a mold-close operation is started after the molded article held by the grasping member is moved out of the mold area, and the grasping member is controlled, through numerical control by the control means, to move and withdraw from the mold area and the control means supplies a mold-close signal to an open-close mechanism for the movable mold half,so that the movable mold half is moved in the direction corresponding to the mold-close operation at a predetermined time start of withdrawal of the grasping member from the mold area, whereby the mold-close operation finishes when withdrawal of the grasping member from the mold area finishes.

2. A remover for an injection-molded article as set forth in claim 1, wherein the grasping member in the removing mechanism linearly moves forward and backward to go between the front mold half and the movable mold half and withdraw from the mold area.

3. A remover for an injection-molded article as set forth in claim 1, wherein the grasping member in the removing mechanism goes between the front mold half and the movable mold half, in an arcuate forward and backward movement, and withdraws to the outside from the mold area.

* * * * *